(12) United States Patent
Dietz

(10) Patent No.: US 7,234,415 B2
(45) Date of Patent: Jun. 26, 2007

(54) MULTIPLE FUNCTION ANIMAL FURNITURE SYSTEM

(76) Inventor: Dan L. Dietz, 10234 Emerald Dr., Houston, TX (US) 77074

( * ) Notice: Subject to any disclaimer, the term of this patent is extended or adjusted under 35 U.S.C. 154(b) by 0 days.

(21) Appl. No.: 11/287,716

(22) Filed: Nov. 28, 2005

(65) Prior Publication Data

US 2006/0249086 A1    Nov. 9, 2006

Related U.S. Application Data

(63) Continuation-in-part of application No. 11/121,797, filed on May 4, 2005.

(51) Int. Cl.
*A01K 1/035* (2006.01)
*A01K 1/03* (2006.01)
(52) U.S. Cl. .................... 119/28.5; 119/482; 119/849
(58) Field of Classification Search ............... 119/28.5, 119/482, 485, 706, 847, 849
See application file for complete search history.

(56) References Cited

U.S. PATENT DOCUMENTS

| | | | |
|---|---|---|---|
| 2,532,863 A | 12/1950 | Taylor | |
| 2,579,797 A | 12/1951 | Churchfield et al. | |
| 3,234,908 A | 2/1966 | Doskocil | |
| 3,618,568 A * | 11/1971 | Breeden | 119/482 |
| 4,224,899 A | 9/1980 | Cruchelow et al. | |
| 4,334,501 A | 6/1982 | McDaniel et al. | |
| 4,347,807 A | 9/1982 | Reich | |
| D288,970 S | 3/1987 | Runion | |
| 4,719,656 A | 1/1988 | Godinet | |
| 4,838,204 A | 6/1989 | Young | |
| 5,148,768 A | 9/1992 | Hinton | |
| 5,211,130 A * | 5/1993 | Elias et al. | 119/28.5 |
| D369,885 S | 5/1996 | Zeiler | |
| 5,662,065 A | 9/1997 | Bandimere et al. | |
| 5,765,505 A | 6/1998 | Yun | |
| 5,778,822 A | 7/1998 | Giffin et al. | |
| 6,189,487 B1 | 2/2001 | Owen et al. | |
| 6,267,082 B1 * | 7/2001 | Naragon et al. | 119/849 |
| 6,295,950 B1 | 10/2001 | Deitrich et al. | |
| 6,490,995 B2 | 12/2002 | Greene, Jr. | |
| 6,588,366 B1 | 7/2003 | Ranson et al. | |

(Continued)

OTHER PUBLICATIONS

PCT International Search Report for International Application No. PCT/US2006/017361 dated Sep. 12, 2006 (2 p.).

(Continued)

*Primary Examiner*—Rob Swiatek

(57) ABSTRACT

A multi-purpose furniture structure and system can be used for caring for an animal throughout the life of the animal. For small animals such as puppies, this furniture system can be used as a dwelling in which the owner can train the animal to behave in a desired manner. Animal toys are stored in the animal living space as well. A removable barrier such as a grate or plastic ventilated sheet could cover a front opening to prevent undesirable movement of the animal in and out of the furniture structure. Animals can use a detachable ramp member to climb to the top of the furniture structure. For larger or older animals, the furniture structure can serve a bed or as a means to help the animal get into the bed of the owner. The furniture structure can form a bed for animals of all ages. The bed can be positioned adjacent an owner's bed.

20 Claims, 4 Drawing Sheets

U.S. PATENT DOCUMENTS

| | | |
|---|---|---|
| 6,748,895 B2 | 6/2004 | Besenzoni |
| 2002/0152969 A1 | 10/2002 | Grigsby et al. |
| 2003/0066489 A1 | 4/2003 | Whitehill |
| 2004/0134433 A1 | 7/2004 | Holder |
| 2004/0177814 A1 | 9/2004 | Godshaw |
| 2005/0279286 A1 | 12/2005 | Youngmark |
| 2006/0042548 A1 | 3/2006 | Tharalson et al. |
| 2006/0112897 A1 | 6/2006 | Moore |
| 2006/0118051 A1 | 6/2006 | Lima |

OTHER PUBLICATIONS

PCT International Search Report for International Application No. PCT/US2006/017029 dated Sep. 15, 2006 (2 p.).

PCT International Search Report for International Application No. PCT/US2006/017011 dated Sep. 11, 2006 (2 p.).

* cited by examiner

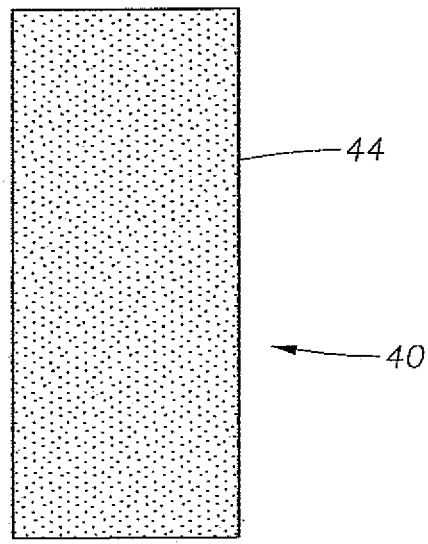
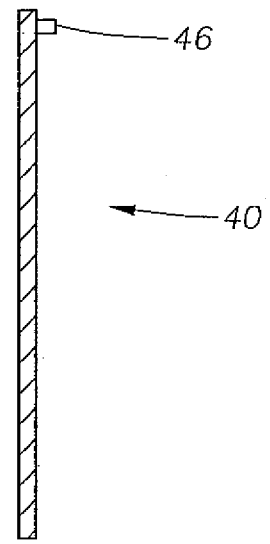
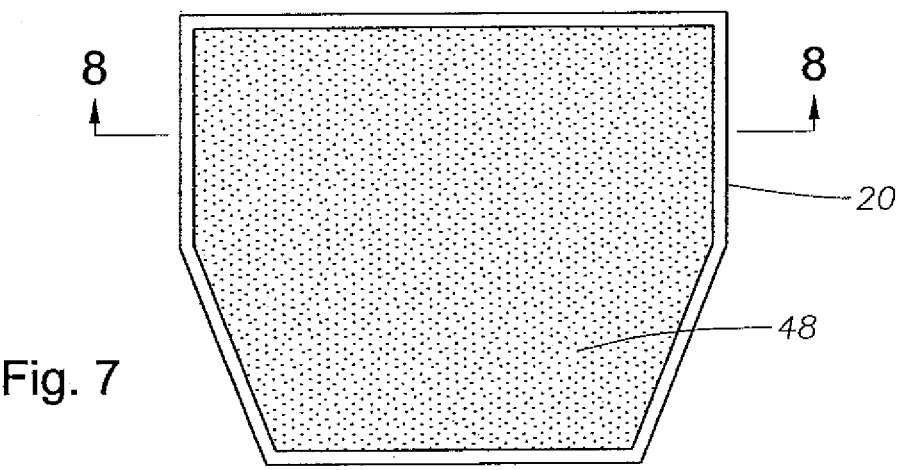
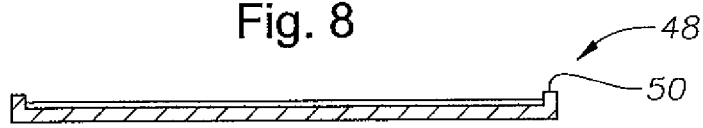

MULTIPLE FUNCTION ANIMAL FURNITURE SYSTEM

CROSS-REFERENCE TO RELATED APPLICATIONS

This application is a continuation-in-part of and is related to and claims priority from utility patent application Ser. No. 11/121,797 filed on May 4, 2005, the contents of which are incorporated herein by reference.

FIELD OF THE INVENTION

This invention relates to furniture for an animal and in particular to a piece of furniture that has multiple configurations and can function in multiple ways to accommodate various desires of the animal at any stage of growth. More particularly this furniture structure and system can function as 1) a living quarters for smaller animals such as puppies during house training periods, 2) a storage location for objects, related to the animal, or 3) as an animal bed, a sitting bench for humans or animals, or as an animal step for getting into a human bed.

BACKGROUND OF THE INVENTION

For many people, pet animals are literally members of the family. Some of these pets live inside the home with the owner and have many accessories designed specially for the animal. As with the 'dog houses' kept in the yard, some of the furnishings provide a place for the animal to dwell as well as providing a storage place for the toys of the animal. One conventional piece of animal furniture is a bed. There have been many types of animal beds. These beds come in various designs. Some of the designs include beds shaped as different types of animals. Many beds in the form of animal designs are made of a cushion material to facilitate animal comfort.

One animal bed U.S. Pat. No. 5,662,065 describes an animal bed that includes an annular bed frame defining an interior chamber. A perforated top wall is supported at its periphery by the bed frame to receive and support the animal above the chamber. The perforated top wall is composed of a non-woven fabric material to provide a hammock like suspension for the animal, and to permit small insects to fall through the top wall. The chamber is dimensioned to provide a space below the top wall sufficient to inhibit the insects from traveling upwardly through the top wall. An insect exterminating composition contained within the chamber receives the falling insects and destroys them.

U.S. Pat. d288,970 describes a combined animal bed and housing unit. This design has a bed mat resting on a storage unit. The bed also has a canopy covering the mat. The animal would rest on the mat and would be covered by the canopy.

Although the animal bed is a common piece of furniture for the inside pet, animals do more than just sleep. For indoor animals, there is a need for the animal to know when, where and how to 'use the bathroom'. Cats usually have a litter box for waste. Many pets and owners have a system by which the pet is let out of the house on a periodic basis to relieve themselves. Pets also have toys with which they play. One particular thing some pets like to do is to climb up on the owner's bed. The climbing is necessary because many pets cannot jump high enough to reach the surface of the bed in one jump. The climbing process results in the pet pulling and sometimes tearing the bed linen. Pets also do not stay the same size. As the pet grows, it is often necessary to replace a piece of animal furniture with a different type of furniture or a larger size of the same furniture.

With all of the different types of animal furniture that are available to accommodate the many needs of the pet and pet owner, there remains a need for a multiple function piece of animal furniture. The animal throughout the animal's life can use this piece of furniture. Basically, the piece of furniture can serve as an indoor dwelling for the animal. This piece of furniture could assist in potty training animals as well as other behavior training. The multiple function furniture piece can also have components that enable the animal to climb up the furniture and get into an owner's bed. Further, this furniture piece can serve as an elevated bed for larger animals.

SUMMARY OF THE INVENTION

It is an objective of the present invention to provide a multiple purpose animal furniture system that can accommodate uses of animals at all ages.

It is a second objective of the present invention to provide a multiple purpose piece of animal furniture with modular components to provide the capability to reconfigure the furniture as needed.

It is a third objective of the present invention to provide a training cage to assist in training of small animals for indoor living.

It is a fourth objective of the present invention to provide a removable floor cover for the furniture piece to facilitate ease of cleaning animal waste.

It is a fifth objective of the present invention to provide a furniture piece with a living and storage area.

It is a sixth objective of the present invention to provide a removable grill-type cover that serves as a guard to keep a smaller animal inside the furniture piece.

It is a seventh objective of the present invention to provide a multiple purpose animal furniture piece that can be used as a bed for an animal or a rest bench for humans.

It is an eighth objective of the present invention to provide a portable piece of animal furniture that can be made of various materials such as wood, plastic or metal.

It is a ninth objective of the present invention to provide a portable piece of animal furniture that can be positioned adjacent to an owner's bed.

It is a tenth objective of the present invention to provide a container in which to bury a deceased animal.

The present invention provides a multi-purpose furniture piece and system that can be used for an animal throughout the life of the animal. For small animals such as puppies, this furniture system can be used as a dwelling in which the owner can train the animal to behave in a desired manner. The animal training could include animal potty training. Animal toys can also be stored in the animal living space as well. A removable barrier such as a grate or plastic ventilated sheet could cover a front opening to prevent undesirable movement of the animal in and out of the furniture piece. Animals can use a detachable ramp member to climb to the top of the furniture piece. For larger or older animals, the furniture piece can serve as a bed or as a means to help the animal get into the bed of the owner. The furniture piece can form a bed for animals of all ages. The bed can be positioned adjacent an owner's bed.

This invention comprises a multiple function piece of furniture used primarily for the activities of a pet. The furniture piece can have various shapes, for example a square or rectangular shape design with four sides, a top surface and an optional bottom surface. The top is connected to the walls with hinges that allow the top to raise thereby opening the furniture piece. The front side of the furniture piece is open to allow for storing objects inside the furniture piece. An optional metal or plastic grate or screen can cover the front opening. This cover can be a detachable member of the furniture piece. Additional openings can also be included in the design of the furniture. These openings would be smaller in size and would be in sides away from the front opening. These side openings would also be covered with a cover similar to the front opening. The furniture piece can have a floor inside the storage or living area. A mat material lines the floor. This material is removable from the furniture piece. A primary purpose of the material is to serve as a potty training mat. The bottom of that open side has a lip element that extends the complete length of that side to prevent objects from rolling out of the furniture bed. Lips can also extend upward from each side of the furniture piece to create an area on the top for a sleeping pad for an animal. The pad serves as the animal bed. The material for the animal bed element can be of any conventional material that is used in animal beds. The remaining walls of the furniture bed will be solid. The multiple function furniture piece can be positioned adjacent a human bed enabling humans to use the bed as a rest bench or as a step to enable animals to get into the human bed or to the top of the furniture piece.

DESCRIPTION OF THE DRAWINGS

FIG. 5 is a front side view of the ramp member.

FIG. 6 is a side-cross-section view of the ramp member showing a lip used to enable the ramp member to engage the furniture piece.

FIG. 7 is view down on the floor mat positioned in the furniture piece.

FIG. 8 is a side cross-section view of the floor mat.

FIG. 9 is a cross-section view of the cushion material positioned on the top of the furniture piece.

DETAILED DESCRIPTION OF THE INVENTION

The multiple function animal furniture piece of the present invention provides an animal owner with a system they can use for an animal throughout the life of the animal. The invention can serve as a training cage to help train small animals such as puppies for living indoors. A detachable mat on the floor of the furniture piece provides for ease in cleaning animal waste. A removable front cover such as a grill or grate can serve to restrict undesired movement of the animal in and out of the furniture piece. As an animal gets older and or bigger, the animal may no longer dwell inside the furniture. At this point, the furniture piece can have another function as a storage structure. As will be discussed, the furniture system of this invention has an attachable ramp member for use by an animal to climb to the top of the furniture structure. This ramp is especially useful for smaller animals and older animals. The ramp can be stored inside the furniture structure when the ramp is not in use. This animal structure is portable and can be positioned adjacent the owner's bed. In this arrangement, the animal can easily move to the owner's bed. Further, the owner can easily sit on the top of the structure. When an animal dies, the structure can be converted into a container (coffin) for burying the deceased animal.

Figure 1:
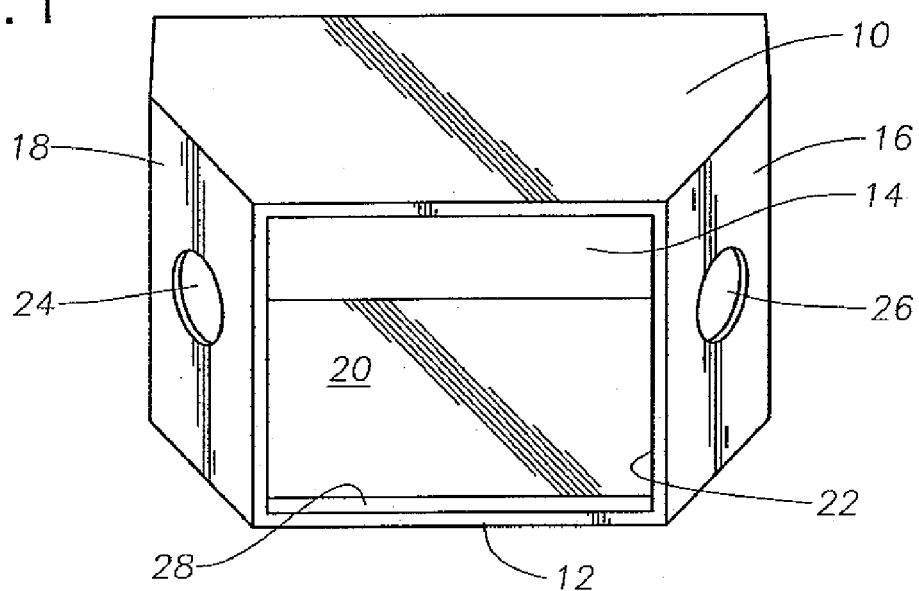
FIG. 1 is a front, top and side view of the multiple function animal furniture piece.

FIG. 1 shows a general design of the multiple function animal piece of the present invention. Other configurations such as those described in U.S. patent application Ser. No. 11/121,797 to the same inventor can be implemented to achieve the same results as the design described in FIG. 1. As shown, this piece has a top 10, open front side 12, a back side 14, multiple side walls 16 and 18. The number of sides will vary with the particular design shape. This furniture piece can also contain a floor 20. The front side 12 has an opening 22, which covers a large portion of the front side 12. This large opening allows for animals to easily enter the furniture piece. The opening 22 also allows for easy insertion of toys and food and water trays into the furniture piece. In addition, smaller openings 24 and 26 can be included in the side walls 16, 18. These opening 24, 26 improve ventilation in the furniture piece. The front side 12 also has a lip 28 that extends up from the base. This lip 28 serves to prevent toys such as balls from accidentally rolling out of the furniture piece. In addition, a lip section can also be attached to the top surface 10 to serve as restraining means to stabilize the cushion and keep the cushion stationary when an animal is resting on it.

Figure 2:
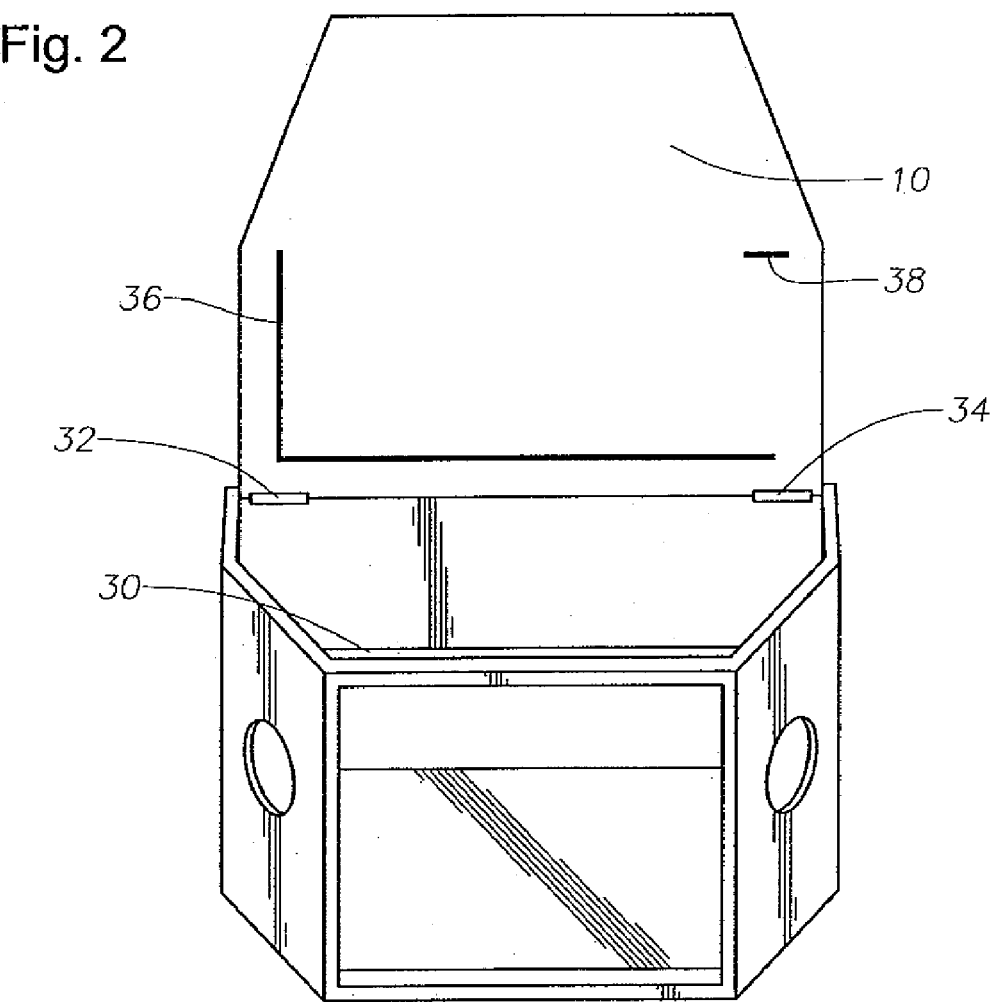
FIG. 2 is a view of the multiple function animal furniture piece with the top extended up to open the furniture piece.

FIG. 2 shows the animal furniture piece of the present invention with the top 10 extended in an upward position, which thereby opens up the piece. As shown, a bar 30 extends across the front side 12 of the piece and serves as a rest bar for the top 10. Hinges 32 and 34 attach the top 10 to the back side 14 and allow the top side 10 to open and close as desired. Attached to the inside surface of the top side 10 is a rack means 36 for holding a ramp member when the ramp member is not in use. The rack means 36 has an L-shape that fits with the shape of a rectangular ramp member. This L-shaped rack is really a groove with a generally u-shape in which the ramp member is placed. When the ramp member is placed in the rack means 36, a latch 38 secures the ramp in the latch member.

Figure 3:
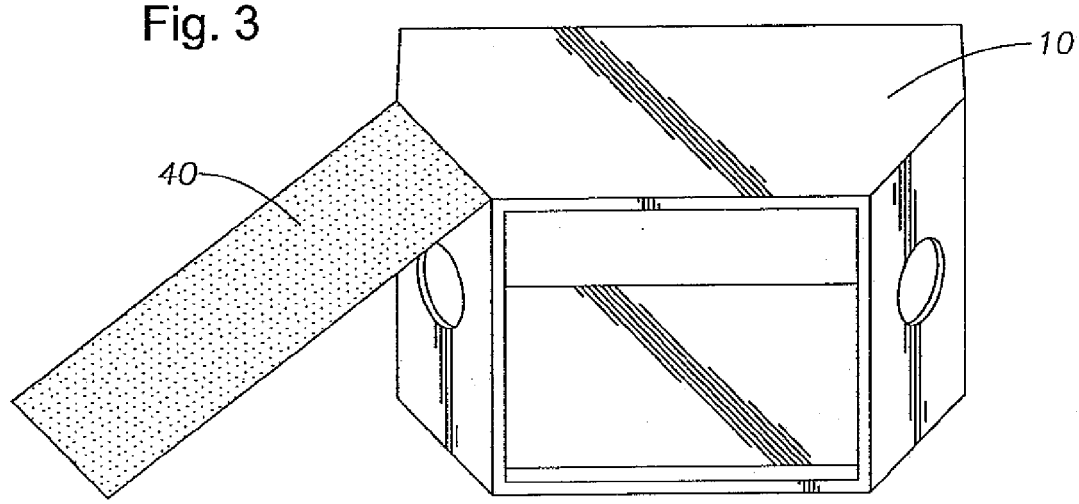
FIG. 3 is a view of the multiple function animal furniture piece with a ramp member extended from the furniture piece.

FIG. 3 shows a configuration of the animal furniture piece with a detachable ramp 40 engaged at one side. In this configuration, an animal can climb to the top side 10 of the furniture piece without the need to climb up on a bed or other piece of furniture. Depending on the height of the furniture piece, the length of the ramp 40 can vary such that the inclination angle formed by the engagement of the ramp 40 to the furniture piece is not too steep for the animal to safely climb.

Figure 4:
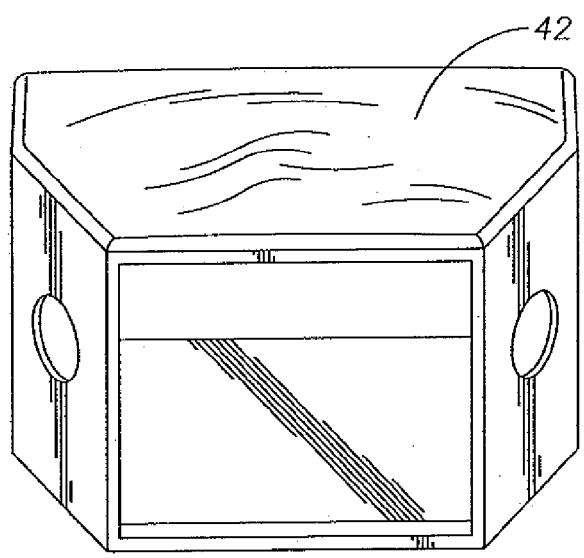
FIG. 4 is a view of the multiple function animal furniture piece with a cushion material positioned on the top on which an animal would rest or sleep.

FIG. 4 shows the animal furniture piece with the cushion material 42 positioned on the top side 10 of the piece. As mentioned, this piece serves as a cushion on which an animal can rest or sleep. FIG. 9 shows the cross-section of a typical cushion that can be used with the furniture piece of the present invention. Other types of cushions with varying shapes can also be implemented in a similar manner.

FIG. 5 shows a front view of the ramp member 40. Attached to this front side is a fiber-type material such as a cloth or carpet material 44. This material increases the friction of the ramp 40 such that an animal can have good traction as it climbs the ramp to the top of the furniture piece. FIG. 6 shows a side cross-sectional view of the ramp 40. The ramp 40 contains a lip 46 that engages the edge of the top side securing the ramp 40 to the furniture piece.

FIG. 7 shows a view of the floor 20 of the animal piece covered by a mat material 48. This material can be an elastic or rubber type of material or other type of water-proof material. The material extends up the side walls of the furniture piece thereby covering substantially all of the floor 20. This mat material 48 provides a way to easily clean the furniture piece. As mentioned, this furniture piece can serve as a house for a smaller pet. These pets are initially not potty trained. Any waste secreted by the animal would not penetrate to the floor 20. When cleaning, the owner can raise the top 10 of the furniture piece and remove the mat 48. The owner can then clean the mat 48. FIG. 8 shows the cross-section of the mat 48. The edge 50 of the mat 48 has a lip shape that prevents substances from escaping the mat surface. The mat 48 can also have a ridged surface similar to FIG. 9 for channeling liquid.

Figure 10:
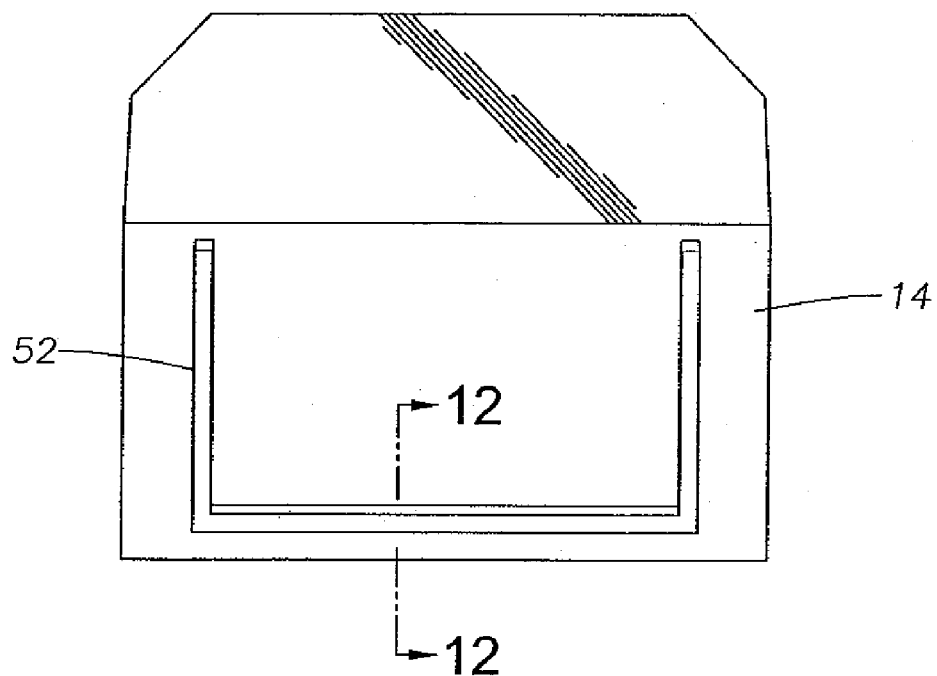
FIG. 10 is a view of the back side of the furniture piece showing a rack means used to store a grate or screen.
Figure 11:
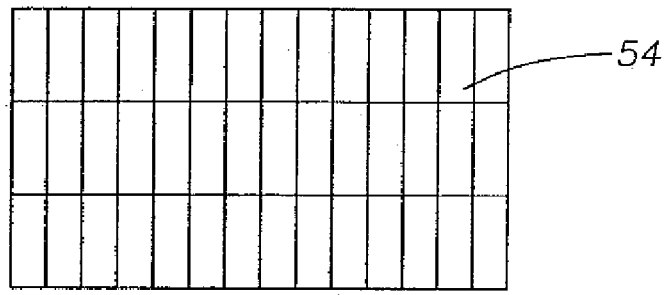
FIG. 11 is a design of a detachable grate used to cover the front opening of the furniture piece.
Figure 12:
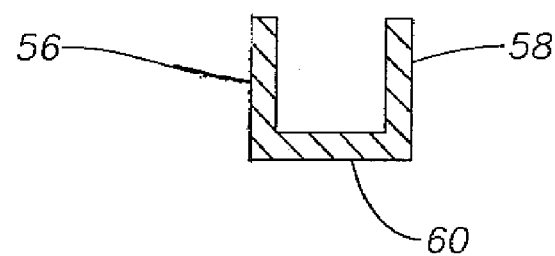
FIG. 12 is a cross-section view of the guide used for storing the grate.

FIG. 10 shows the back side 14 of the furniture piece. Attached to this back side 14 is a storage rack 52 similar to the rack means 36. This rack 52 is for the purpose of holding grate 54 shown in FIG. 11. The rack 52 has a general shape that matches the shape of the grate 54. FIG. 12 shows a cross-section of the rack 52. This rack 52 has two sides 56 and 58 and a base 60. The two sides 56, 58 are perpendicularly attached to the base 60. One side is also attached to the back side 14 of the furniture piece. When the grate 54 is not in use, the owner can easily slide the grate 54 into the rack 52 for storage purposes. The grate 54 is used to cover the front opening 22. The grate 54 can have different designs and can also consist of screen material. In addition, other conventional materials such as plastic can be used as this front opening cover.

As mentioned, the structure and system of the present invention provides the owner of an animal with the versatile means for providing care for the animal. This structure and system can accommodate activities for animals of all ages and sizes. The structure serves as both a dwelling for small animals as well as a training cage to teach certain behaviors. The internal storage capacity makes this structure useful for any animal that has toys. The ability to store the detachable components of the system within the structure itself makes this system easy to manage. The portability of the structure enables the owner to position it at any location. As mentioned, owners can use it as a bed for the animal or as a means for the animal to climb into the owner's bed. The attachable ramp also makes it easy for animals of all ages and sizes to climb the ramp to the top side of the structure. At the animal's death, the structure can serve as a container coffin in which to bury the animal.

The present invention provides significant advantages over the current art. The invention has been described in connection with its preferred embodiments. However, it is not limited thereto. Changes, variations and modifications to the basic design may be made without departing from the inventive concepts in this invention. In addition, these changes, variations and modifications would be obvious to those skilled in the art having the benefit of the foregoing teachings. All such changes, variations and modifications are intended to be within the scope of this invention.

I claim:

1. A multiple function animal furniture structure comprising:
 a structure having a top side, a bottom side, a back side and at least one side wall, said top side capable of supporting a sleeping material for an animal, said top side capable of being positioned in multiple angles with regard to said bottom side to allow for the opening and closing of the structure;
 a front side connected to said top and bottom sides, said front side having an opening substantially forming said front side;
 a lip element extending up from said front side and extending the length of said front side; and
 a support bar extending across the front side at the top edge of the front side, said bar providing support for the to side when in a closed position.

2. The multiple function animal furniture structure as described in claim 1 further comprising a detachable ramp member, said detachable ramp member providing a surface on which an animal can climb to the top side of the structure.

3. The multiple function animal furniture structure as described in claim 2 further comprising a rack member attached to said top side, said rack member capable of securing and holding said detachable ramp member when said detachable ramp member is not in use.

4. The multiple function animal furniture structure as described in claim 3 further comprising a second rack member attached to said back side, said second rack member capable of securing and holding said detachable ramp member when said detachable ramp member is not in use.

5. The multiple function animal furniture structure as described in claim 3 further comprising a latch member positioned in close proximity to said rack member for further securing the stored detachable ramp member.

6. The multiple function animal furniture structure as described in claim 2 wherein said detachable ramp member further comprises a fiber material attached to an upper side of said detachable ramp member to provide friction when an animal is climbing said detachable ramp member.

7. The multiple function animal furniture structure as described in claim 6 wherein said detachable ramp member has a lip member attached on a down side of the detachable ramp member, said lip member engaging the top side of the structure and thereby securing said detachable ramp member to said structure.

8. The multiple function animal furniture structure as described in claim 1 further comprising a mat material, wherein said mat material further comprises a lip edge to prevent liquids from escaping to the bottom side of the structure.

9. The multiple function animal furniture structure as described in claim 1 further comprising a detachable screen member covering the opening in said front side.

10. The multiple function animal furniture structure as described in claim 9 wherein said screen member is a grate.

11. The multiple function animal furniture structure as described in claim 1 wherein the opening is covered.

12. The multiple function animal furniture structure as described in claim 1 wherein said structure is comprised of a rubber material.

13. The multiple function animal furniture structure as described in claim 1 wherein said structure is comprised of a wood material.

14. The multiple function animal furniture structure as described in claim 1 wherein said structure is comprised of a plastic material.

15. The multiple function animal furniture structure as described in claim 1 wherein said structure is comprised of a metal material.

16. A multiple function animal furniture structure comprising:
- a structure having a top side, a bottom side, a back side and at least one side wall, said top side capable of supporting a sleeping material for an animal, said top side capable of being positioned in multiple angles with regard to said bottom side to allow for the opening and closing of the structure;
- a front side connected to said top and bottom sides, said front side having an opening substantially forming said front side;
- a lip element extending up from said front side and extending the length of said front side;
- a detachable ramp member, said detachable ramp member providing a surface on which an animal can climb to the top side of the structure; and
- a rack member attached to said top side, said rack member capable of securing and holding said detachable ramp member when said detachable ramp member is not in use.

17. The multiple function animal furniture structure as described in claim 16 further comprising a second rack member attached to said back side, said second rack member capable of securing and holding said detachable ramp member when said detachable ramp member is not in use.

18. The multiple function animal furniture structure as described in claim 16 further comprising a latch member positioned in close proximity to said rack member for further securing the stored detachable ramp member.

19. The multiple function animal furniture structure as described in claim 16 wherein said detachable ramp member further comprises a fiber material attached to an upper side of said detachable ramp member to provide friction when an animal is climbing said detachable ramp member.

20. The multiple function animal furniture structure as described in claim 16 further comprising a mat material, wherein said mat material further comprises a lip edge to prevent liquids from escaping to the bottom side of the structure.

* * * * *